United States Patent [19]

Lohse et al.

[11] 3,821,165

[45] June 28, 1974

[54] NEW THERMOSETTING MIXTURES OF POLYISOCYANATES, WEAKLY BRANCHED POLYESTERS AND POLYOLES

[75] Inventors: Friedrich Lohse, Oberwil Basel-Land; Rolf Schmid, Reinach Basel-Land; Hans Batzer, Arlesheim, all of Switzerland

[73] Assignee: Ciba-Geigy Corporation, Ardsley, N.Y.

[22] Filed: May 24, 1972

[21] Appl. No.: 256,527

[30] Foreign Application Priority Data
June 3, 1971   Switzerland.......................... 8116/71

[52] U.S. Cl...... 260/47 CB, 117/161 KP, 260/37 R, 260/37 M, 260/75 AT, 260/75 NK, 260/75 NP
[51] Int. Cl... C08g 22/12, C08g 22/24, C08g 22/44
[58] Field of Search ...... 260/75 NK, 75 NP, 75 AT, 260/47 CB

[56] References Cited
UNITED STATES PATENTS 3,674,746   7/1972   Lohse et al. .................... 260/75 NP
3,678,009   7/1972   Lohse et al. .................... 260/75 NP
3,718,623   2/1973   Lohse et al. .................... 260/75 NP Primary Examiner—Lester L. Lee

[57] ABSTRACT

Heat-curable plasticised mixtures for the manufacture of moulding materials based on polyurethanes, containing (a) a polyisocyanate, (b) a slightly branched polyester possessing terminal hydroxyl groups and (c) a defined aromatic polycarboxylic acid hydroxyester containing at least one secondary hydroxyl group (for example a hydroxyester manufactured by reacting 1 mol of trimellitic anhydride and 1 mol of 1,2-propanediol in a first stage, and further reaction with 2 mols of cresylglycid), with the mixture containing, per 1 equivalent of isocyanate group, 0.05 to 0.3 hydroxyl equivalents of the polyester (b) and 0.3 to 1.0 hydroxyl equivalents of the aromatic polycarboxylic acid hydroxyester (c). The mouldings obtained by hot curing of the moulding compositions are flexible, tough and impact-resistant, and these mechanical properties are largely independent of temperature; a transition to the soft rubbery-elastic state only occurs above 150°C.

9 Claims, No Drawings

NEW THERMOSETTING MIXTURES OF POLYISOCYANATES, WEAKLY BRANCHED POLYESTERS AND POLYOLES

It is known that by reacting polyisocyanates with aliphatic polyesters which possess OH terminal groups it is possible to manufacture flexible moulded articles which have a high degree of flexibility at room temperature. However, such moulded articles become easily deformed and already at slightly elevated temperature still possess only slight strength. It was possible to improve the strenght at elevated temperature by the synthesis of polymers which contain crystalline zones. These elastomeric polymers partly possess a relatively high strenght at higher temperatures, in particular after prior stretching. However, the moulded articles have a low E-module and, particularly in the nonstretched state, become easily deformed. As a rule they are fusible under heat and cannot be processed by the casting or impregnating process. Moreover, the permanent deformation (stretching) is disadvantageous.

The discovery has now been made that by reacting polyisocyanates (1) with aliphatic, slightly branched polyesters which possess OH terminal groups (2) and specially structured polyoles (3), flexible, tough, impact resistant moulded articles are obtained whose mechanical properties are very largely independent of temperature. The moulded articles in general have a good elasticity and good dimensional stability towards deformation up to relatively high stresses. They are infusible and change into the soft rubbery-elastic state only at high temperatures, in most cases only from above 150°C. The moulded articles are amorphous, in general display no permanent deformation and also no crystallisation skrinkage upon cooling. These factors open up whole new perspectives for the industrial application of the new flexible polyurethane resin mixtures, particularly in the field of casting, impregnating and laminating resins, of foam plastics, bonding agents, tool resins and moulding materials.

The present invention therefore relates to thermosetting, plasticised mixtures based on polyisocyanates, weakly branched polyesters and polyoles, which are suitable as casting, impregnating and laminating resins and as bonding agents and moulding materials, which mixtures contain (1) a polyisocyanate containing on average more than one isocyanate group in the molecule; (2) a weakly branched polyester which possesses terminal hydroxy groups and corresponds to the general formula $$A-(OH)_x \qquad (I)$$

wherein A represents an $x$-valent, weakly branched long-chain polyester radical in which alkylene and/or alkenylene chains alternate with carboxylic ester groups, and having a molecular weight of about 750 to about 10,000, preferably from 1,200 to 5,000, and $x$ represents the number 3 or 4, preferably 4, and (3) an aromatic polycarboxylic hydroxy ester which possesses at least one secondary hydroxyl group and has the formula

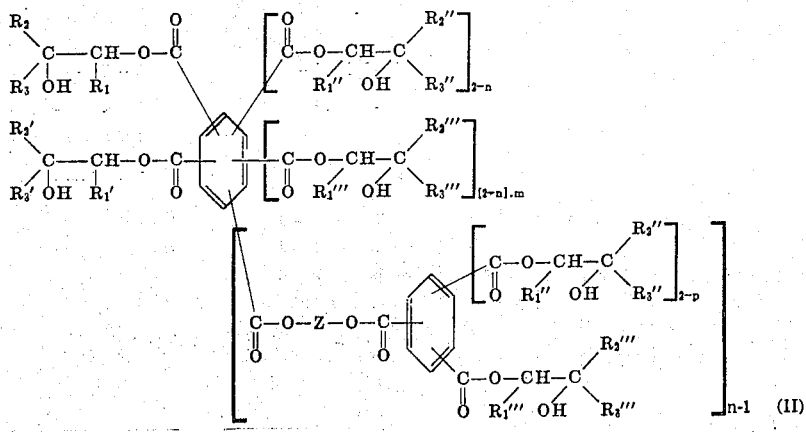

wherein $R_1$, $R_1'$, $R_1''$, $R_1'''$, $R_2$, $R_2'$, $R_2''$, and $R_2'''$ each represent a hydrogen atom or a methyl group, or $R_1$ and $R_2$ or $R_1'$ and $R_2'$ or $R_1''$ and $R_2''$ or $R_1'''$ and $R_2'''$ together represent a bivalent aliphatic or cycloaliphatic radical which is necessary to complete a ring, $R_3$, $R_3'$, $R_3''$ and $R_3'''$ each represent a hydrogen atom or an aliphatic, cycloaliphatic, aralphatic, aromatic or heterocyclic monovalent radical which is unsubstituted or substituted or interrupted by oxygen atoms, and at least one of the radicals $R_3$, $R_3'$, $R_3''$ or $R_3'''$ represents such an aliphatic, cycloaliphatic, aralphatic, aromatic or heterocyclic radical, Z represents an alkylene radical containing from two to three carbon atoms, $m$ represents 0 or 1 and $n$ and $p$ represent 1 or 2, and in the curable mixture for every 1 equivalent of isocyanate group of the polyisocyanate (1) there is present in each case 0.3 to 1.0 equivalent of hydroxyl groups of the aromatic polycarboxylic acid ester which contains hydroxyl groups (3) and in each case 0.02 to 0.5, preferably 0.05 to 0.3 equivalent of hydroxyl groups of the polyester (2).

Instead of the individual components (1) and (2), the curable mixtures according to the invention may also contain a prereacted addition product of the polyisocyanate (1) and the polyester (2), in which case there is used for the adduct formation in each case, as indicated hereinbefore, for every 1 equivalent of isocyanate group 0.02 to 0.5 equivalent of hydroxyl groups of the polyester.

In place of the individual components (1) and (2), the curable mixtures according to the invention may also contain a prereacted addition product of the polyisocyanate (1) and the polyester (2), there being used for the adduct formation in each case 0.02 to 0.5 equivalent of hydroxyl groups of the polyester for every 1 equivalent of isocyanate group, as indicated hereinbefore.

In the curable mixtures according to the invention, there may be used as polyisocyanates basically all known types which are compatible with the components (2) and (3). Polyisocyanates, chiefly diisocyanates, of the aliphatic, cycloaliphatic, aralphatic, aromatic and heterocyclic series are suitable.

As examples there may be cited:
ethylene diisocyanate, trimethylene diisocyanate, diisocyanates of the formula OCN-Y-NCO, wherein A represents the hydrocarbon radical of an optionally hydrogenated dimerised fatty alcohol; toluylene-diisocyanate-(2,4), toluylene-diisocyanate-(2,6) or industrial mixtures thereof; diphenylmethane-4,4'-diisocyanate, 3,3'-dimethyl-biphenyl-4,4'-diisocyanate, 3,3'-dimethoxy, 4,4'-biphenyl-diisocyanate, 3,3'-dichloro-biphenyl-4,4'-diisocyanate, 4,4'-biphenyl-diisocyanate, diphenyldimethyl-methane-4,4'-diisocyanate, p.p'-bibenzyl-diisocyanate, phenylene-1,4-diisocyanate, phenylene-1,3-diisocyanate, 2,3,5,6-tetramethyl-p-phenylene-diisocyanate; the addition products of 2 moles of toluylene-2,4-diisocyanate with 1 mole of a glycol, or of 3 moles of toluylene-2,4-diisocyanate with 1 mole of a triol, such as 1,1,1-trimethylolpropane, whereby ideally a trifunctional, aromatic isocyanurate containing urethane groups is formed, also the corresponding addition products of 2 moles of "Isophorondiisocyanat" with 1 mole of a glycol.

The use of diisocyanates of the cycloaliphatic, cycloaliphatic-aliphatic or araliphatic series is preferred, for example: cyclopentylene-diisocyanate-1,3, cyclohexylene-diisocyanate(1,4), -(1,3) or -(1,2), hexahydrotoluylene-diisocyanate-(2,4) or -(2,6), 3,5,5-trimethyl-3-isocyanatomethyl-cyclohexaneisocyanate-(1) (="Isophoron-diisocyanate"), dicyclohexyl-methane-diisocyanate-(4,4'), o-, m- and p-xylylene-α,α-diisocyanate.

Preferred diisocyanates are also those of the heterocyclic-aliphatic series, as examples of which there may be cited:
1,3-di-(γ-isocyanatopropyl)-hydantoin, 1,3-di(γ-isocyanatopropyl)-5-methyl-hydantoin, 1,3-di-(γ-isocyanatopropyl)-5,5-dimethyl-hydantoin, 1,3-di-(γ-isocyanatopropyl)-5-methyl-5-ethyl-hydantoin, 1,3-di-(γ-isocyanatopropyl)-5-ethyl-hydantoin. 1,3-di-(γ-isocyanatopropyl)-5-propyl-hydantoin, 1,3-di-(γ-isocyanatopropyl)-5-isopropyl-hydantoin, 1,3-di-(γ-isocyanatopropyl)-1,3-diazaspiro-(4,4)-nonane-2,4-dione and 1,3-di-(γ-isocyanatopropyl)-1,3-diaza-spiro-(4,5)-decane-2,4-dione, 1,3-di-(γ-isocyanatopropyl)-5,5-dimethyl-5,6-dihydrouracil and 1,3-di-(γ-isocyanatopropyl)-6-methyl-5,6-dihydrouracil; 1,1'-methylene-bis-(3-γ-isocyanatopropylhydantoin); 1,1'-methylene-bis-(3-γ-isocyanatopropyl-5,5-dimethylhydantoin; 1,1'-methylene-bis-(3-γ-isocyanatopropyl-5-methyl-5-ethylhydantoin); bis-(1'-γ-isocyanatopropylhydantoinyl-3')-methane; 1,2-bis-(1'-γ-isocyanatopropyl-5',5'-dimethylhydantoinyl-3')-ethane; 1,4-bis-(1'-γ-isocyanatopropyl-5'-methyl-5'-ethyl-hydantoinyl-3')-butane; 1,6-bis-(1'-γ-isocyanatopropyl-5'-isopropylhydantoinyl-3')-hexane; 1,12-bis-(1'-γ-isocyanatopropyl-5',5'-pentamethylenehydantoinyl-3')-dodecane and β,β'-bis-(1'-γ-isocyanatopropyl-5',5'-dimethylhydantoinyl-3')-diethyl ether.

The long chain polyesters containing terminal hydroxyl groups which are used for the manufacture of the curable mixtures according to the invention must be relatively weakly branched. Such polyesters are obtained by known methods by the polycondensation of aliphatic dicarboxylic acids with aliphatic diols in the appropriate molecular ratio and in the presence of a polyfunctional starting molecule which effects the branching (a tri- or tetravalent polyol or tri- or tetravalent polycarboxylic acid) or by the polyaddition of several moles of a lactone with 1 mole of a tri- or tetravalent polyol. The chain of such polyesters is built up by the recurring structural element which consists of an alkylene or alkenylene group and a carboxylic acid ester group and should amount to 90 to 98 molar percent in the polyester molecule, whereas the difference from 100 molar percent is attributable to the polyfunctional starting molecule responsible for the branching. Moreover, the average molecular size of the polyesters must lie within certain limits (molecular weight about 750 to about 10,000).

As aliphatic dicarboxylic acids which may be preferably used for the synthesis of such polyesters there may be cited: succinic acid, glutaric acid, adipic acid, pimelic acid, suberic acid, azelaic acid, sebacic acid, nonanedicarboxylic acid, decanedicarboxylic acid, undecanedicarboxylic acid, dodecanedicarboxylic acid, allylsuccinic acid, dodecylsuccinic acid, dodecenylsuccinic acid.

As aliphatic diols which may be preferably used for the synthesis of the instant polyesters there may be mentioned: ethylene glycol, 1,3-propanediol, 1,4-butane diol, 1,5-pentane diol, neopentyl glycol, 1,6-hexane diol, 1,7-heptane diol, 1,8-octane diol, 1,9-nonane diol, 1,10-decane diol, 1,11-undecane diol, 1,12-dodecane diol, 1,6-dihydroxy-2,2,4-trimethylhexane, 1,6-dihydroxy-2,4,4-trimethylhexane.

The weakly branched polyester which contains terminal hydroxyl groups may be manufactured from an aliphatic dicarboxylic acid and an aliphatic diol according to the following reaction equation:

$$D-(OH)_y + (y \cdot z)HOOC-X_1-COOH$$
$$+ (y \cdot z)HO-X_2-OH \longrightarrow D\left[O-\left(CO-X_1-CO-O-X_2-O\right)_z-H\right]_y$$
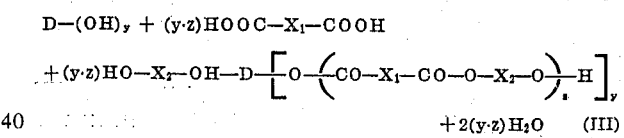
$$+ 2(y \cdot z)H_2O \quad \text{(III)}$$

wherein $X_1$ represents the hydrocarbon radical of an aliphatic dicarboxylic acid obtained by splitting off the carboxyl groups and $X_2$ represents the hydrocarbon radical of an aliphatic diol obtained by splitting off the hydroxyl groups, D represents the hydrocarbon radical of a y-valent aliphatic or cycloaliphatic polyalcohol obtained by splitting off the hydroxyl groups, y represents 3 or 4, preferably 3, and the integer z, which indicates the average number of the structural elements —CO—$X_1$—CO—O—$X_2$—O— per linear branched chain, is so chosen that the average molecular weight of the polyester is about 750 to about 10,000.

Polyvalent polyalcohols of the formula D-(OH)$_y$ which are used as starting molecules are, for example, glycerol, 1,1,1-trimethylolpropane, 1,1,1-trimethylolethane, hexane-1,2,6-triol, hexane-2,4,6-triol, butane-1,2,4-triol, 3-hydroxymethyl-2,4-dihydroxypentane, pentaerythritol, 3,4,8-trihydroxytetrahydro-dicyclopentadiene.

In the above reaction equations, it is also possible to choose as starting molecule a polycarboxylic acid of the formula $D_1(COOH)_y$, wherein $D_1$ is the y-valent hydrocarbon radical of a polycarboxylic acid containing y carboxyl groups (y as a rule = 3 or 4). In this case, 1 mole of the at least trivalent polycarboxylic acid must be reacted in each case with ($y \cdot z$) moles of an aliphatic dicarboxylic acid and $y(z+1)$ moles of an aliphatic diol.

The thus obtained polyesters may be illustrated by the general formula

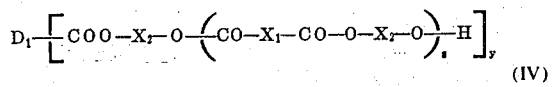
(IV)

wherein $X_1$ and $X_2$ have the same meanings as in formula III, $D_1$ represents the hydrocarbon radical of a $y$-valent aliphatic, cycloaliphatic or aromatic polycarboxylic acid is obtained by splitting off the carboxyl groups, $y$ represents 3 or 4, preferably 3, and the integer $z$, which indicates the average number of the structural elements $-CO-X_1-CO-O-X_2-O-$ per linear branched chain, is so chosen that the average molecular weight of the polyester is about 750 to about 10,000.

Polyvalent polycarboxylic acids of the formula $D_1(COOH)_y$ which are used as starting molecules are, for example, trimellitic acid, trimesic acid, citric acid, tricarballylic acid, malic acid and butane-1,2,4-tricarboxylic acid.

It is, of course, also possible to manufacture polyesters by condensing mixtures of various dicarboxylic acids with mixtures of various diols, always providing that the above postulated conditions with regard to the molecular weight in respect of the resulting polyester are observed.

Also suitable for the purposes of the invention are the polyesters which are obtainable by the addition of $z$ moles of a lactone to 1 mole of a $y$-valent polyol in accordance with the reaction equation

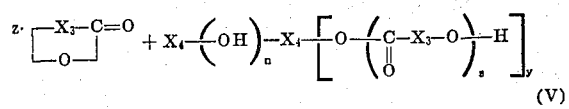
(V)

wherein $X_3$ represents an alkylene chain containing at least 4 and preferably at least five carbon atoms, $X_4$ represents an aliphatic hydrocarbon radical which can be obtained by splitting off the hydroxyl groups, $y$ represents 3 or 4, preferably 3, and the integer $z$, which indicates the average number of structural elements per linear branched chain, is so chosen that the average molecular weight of the polyester is about 750 to about 10,000.

As examples there may be cited the addition products of $z$ moles of $\epsilon$-caprolactone with 1 mole of glycerol, hexane-1,2,6-triol or pentaerythritol.

The aromatic polycarboxylic acid esters (3) which are used in the curable mixtures according to the invention and correspond to the formula (II), wherein $n = 1$, can be manufactured by esterifying a benzenetricarboxylic acid or benzenetetracarboxylic acid, such as trimesic acid, hemimellitic acid and, in particular, trimellitic or pyromellitic acid, or the functional derivatives of these polycarboxylic acids, particuarly the anhydrides, with a monoepoxide of the formula

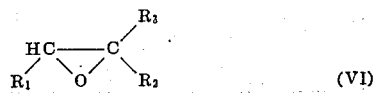
(VI)

or a glycol of the formula

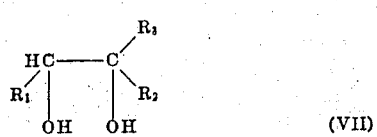
(VII)

in which process the esterification is carried out in a single step or in several steps, and $R_1$, $R_2$ and $R_3$ have the same meanings as in formula (II), but with the proviso that $R_3$ may not be hydrogen if the esterification is carried out in a single step with a unitary compound of the formula (VI) or (VII). On the other hand, it is possible to use a compound, in which $R_3$ is a hydrogen atom, in a two-step process, wherein in one step at least one carboxyl group of the benzenepolycarboxylic acid is esterified with a monoepoxide (VI) or a glycol (VII), in which $R_3$ is different from hydrogen.

The synthesis of the polycarboxylic acid ester (3) starting from benzenepolycarboxylic acid and monoepoxide (VI) proceeds according to the following reaction scheme:

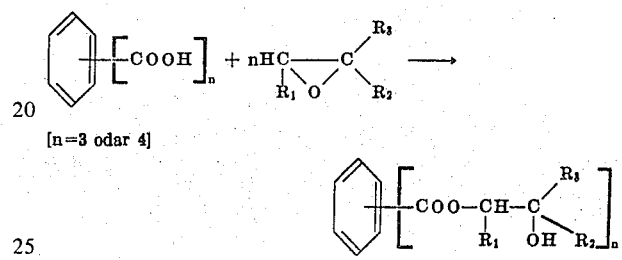

Suitable monoepoxides (VI) for the manufacture of the esters which contain hydroxyl groups are in particular: propene oxide, 1,2-epoxybutane, butane-2,3-epoxide, pentane-2,3-epoxide, cyclohexene oxide, styrene oxide, phenylglycidyl ether, cresylglycidyl ether, N-glycidyl-oxazolidin-2-one, 3(N)-glycidyl-5,5-dimethylhydantoin.

In a multi-step esterification of the carboxyl groups it is also possible to use ethylene oxide, but in this case at least one of the carboxyl groups must be esterified with a monoepoxide which is different from ethylene oxide.

If an anhydride of benzenepolycarboxylic acid is used as starting material, it can be advantageous to carry out the esterification in a first step with 1 mole of a glycol of the formula (VII) for every 1 anhydride group, in the process of which the anhydride groups are split off and half esters with free carboxyl groups are formed. For trimellitic anhydride, this first step has for example the following reaction scheme:

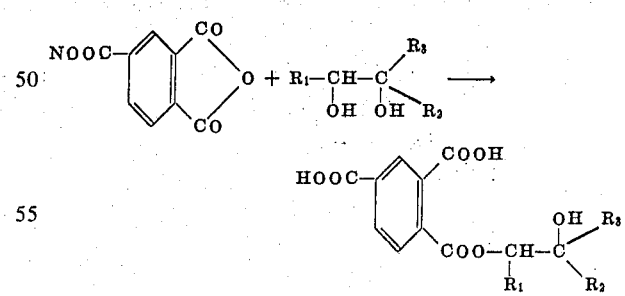

The esterification of the still free carboxyl groups of the resulting half ester is then carried out advantageously by reaction with the necessary equivalent amount of a monoepoxide of the formula (VI), in the process of which the monoepoxide chosen for the esterification of the second step may be derived from a glycol which is the same as, or different from, the glycol used in the first esterification step.

As examples of glycols (VII) there may be cited: 1,2-propane diol, 1,2-butane diol; it is also possible to use ethylene glycol for a partial esterification if in an additional step for the esterification another glycol or a monoepoxide which is different from ethylene oxide is used.

The benzenetri- or tetracarboxylic hydroxy esters of the formula (II) contain preferably at least two secondary hydroxyl groups. The aromatic polycarboxylic acid esters (3) of the formula (II), wherein $n = 2$, can be manufactured by reacting 2 moles of the monoanhydride of a benzenetricarboxylic acid, in particular e.g., trimellitic anhydride, with 1 mole of a glycol containing two or three carbon atoms, such as ethylene glycol, 1,2-propane diol or 1,3-propane diol, in a first step, for example according to the reaction equation

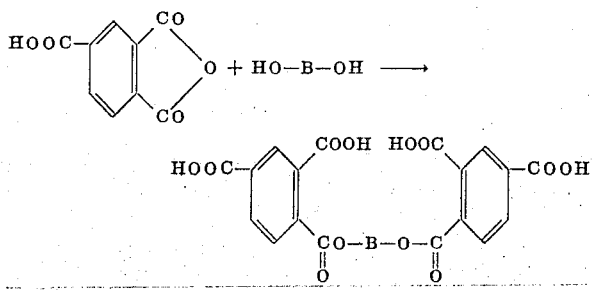

and subsequently esterifying the resulting tetracarboxylic acid with 4 moles of an epoxide of the formula (VI).

The curable mixtures according to the invention are suitable primarily as casting resins, impreganting resins and bonding agents. A further industrially useful field of application is the manufacture of flexible foam plastics which are required to have good resilience and good dimensional stability over as wide a temperature range as possible. By adding suitable organic or inorganic modifiers it is also possible to achieve additionally desired effects, for example increasing the module, the dimensional stability or diminishing the flammability.

As stated at the outset, it is also possible to anticipate the reaction between polyisocyanate (1) and polyester (2), in which case a larger excess of isocyanate is used for this prereaction. Such an adduct, which still contains free isocyanate groups or an amount of non-reacted polyisocyanate, may be used in the curable mixture in place of the non-prereacted individual components (1) and (2). As a rule, moulded articles possessing analogous properties are obtained with such adducts. However, curable mixtures based on such adducts have a high viscosity and are therefore less suitable as casting or impregnating resins. But they can be used with advantage as moulding materials, laminating resins, bonding agents or in the field of surface protection, e.g. as powder for whirl sintering or resin for paints and varnishes, since they display less sensitivity to moisture.

The curing of the curable mixtures according to the invention to moulding materials takes place in known manner, as a rule in the temperature range from 100°–200°C.

The term "curing" as used herein means the conversion of the instant polyisocyanates into insoluble and infusible cross-linked products, as a rule accompanied by their simultaneous formation to moulded articles, such as cast articles, foam plastics, tool resins, moulded articles or laminates, or to sheet or film-like structures such as laquer films or bonds.

The curable mixtures according to the invention may be mixed prior to the curing in any phase with other conventional additives or modifiers, such as fillers, dyes, pigments, flame retardants, mould lubricants etc. As extenders and fillers there may be used, for example, glass fibres, carbon fibres, boron fibres, mica, powdered quartz, cellulose, calcined china clay, ground dolomite, colloidal silica with a large specific surface (=silicic acid aerogel, registered trademark AEROSIL) or metal powder, such as aluminium powder.

The cured moulded articles are disinguished by high flexibility (high deflection at break) and impact strength. The shear modulus at room temperature has been distinctly lowered by the plasticising. The moulding materials have, however, a surprisingly high tensile strength; their electrial and in particular mechanical properties change only very slightly with temperature, so that the moulded articles are still clearly flexible at temperatures below 20°C, but at temperatures up to 100°C and partly up to above 160°C, still display good strengths. The modulus of shear values measured at various temperatures, e.g. according to DIN 53 445, provide a valuable point of reference on the trend of the physical properties as function of the temperature.

In the following Examples the percentages are by weight.

The following long-chain polyesters containing hydroxyl groups and benzenepolycarboxylic acid esters containing hydroxyl groups were used for the manufacture described in the Examples of plasticised, curable mixtures:

Manufacture of long-chain, slightly branched polyesters

Polyester A 24.0 g (0.2 mole) of trimethylolethane were mixed with 484.8 g (2.4 moles) of sebacic acid and 283.2 g (2.4 moles) of hexane-1,6-diol (corresponding to a molar ratio of 1:12:12) and the mixture was heated under a nitrogen atmosphere to 170°C. The reaction mixture was then allowed to react for 2 hours at 170°C, for 3 hours at 190°C, for 2 hours at 210°C and for 15.5 hours at 230°C. In the process, 76.7 g of water (theory:84.4 g) were splitt off. The reaction products was a light brown, hard substance with an acid equivalent weight of 19,600, a hydroxy equivalent weight of 922 (theory:1176) and a melting point of 60°C (measured with a differential scanning calorimeter).

Polyester B 48.0 g (0.4 mole) of trimethylolethane were mixed with 566.4 g (4.8 moles) or succinic acid and 337.6 g (4.8 moles + 13.5 percent) of ethylene glycol (corresponding to a molar ratio of 1:12:12) and the mixture was heated to 160°C under a nitrogen atmosphere. The reaction mixture was then allowed to react for 4 hours at 160°C, for 16 hours at 180°C and for 15 hours at 180°C under 50 mm Hg, in the course of which a light brown prosuct formed which is crystalline at room temperature and with an acid equivalent weight of 90,000 and a hydroxyl equivalent weight of 718 (theory:616).

Polyester C 5.36 g (0.04 mole) of hexane-1,2,6-triol were mixed with 70.08 g (0.48 mole) of adipic acid and 31.3 g (0.48 mole + 5 percent) of ethylene glycol (corresponding to a molar ratio of 1:12:12) and the mixture was heated to 160°C under a nitrogen atmosphere. The reaction mixture was then allowed to react for 35 hours at 160°C and for 17 hours at 160°C under 10 mm Hg. In the process, 8.8 g of water were split off. The reaction product was a grey crystalline substance with an acid equivalent weight of 5585, a hydroxyl equivalent weight of 1108 (theory: 733) and a melting point of 36°C (measured with a differential scanning calorimeter).

Polyester D 9.2 g (0.1 mole) of glycerol were mixed with 278.1 g (3.0 moles + 3 percent excess) of butane-1,4-diol and 300.0 g (3.0 moles) of succinic anhydride (corresponding to a molar ratio of 1:30:30), 0.5 ml of pyridine was added thereto and the mixture heated to 160°C under a nitrogen atmosphere. The reaction mixture was then allowed to react for 13 hours at 160°C and for 73 hours at 160°C under 25 mm Hg. In the process 46 ml of water (theory:54 ml) were split off. The reaction product was a light brown crystalline substance with an acid equivalent weight of 12,680, a hydroxyl equivalent weight of 1591 (theory:1751) and a melting point of 111°C (measured with a differential scanning calorimeter).

Manufacture of benzenepolycarboxylic hydroxy esters
Tetrahydroxy ester I from pyromellitic anhydride, propane-1,2,diol and cyclohexene oxide 76.0 g (1.0 mole) of propane-1,2-diol were mixed with 109.0 g (0.5 mole) of pyromellitic anhydride and 0.7 ml of N-benzyl-dimethylamine and the mixture was dissolved (time required about 15 minutes). Then 138.0 g (1.0 mole + 41 percent excess) of cyclohexene oxide were added dropwise within 30 minutes at the same temperature. The reaction mixture was then allowed to react for 12 hours at 130°C at room temperature. At room temperature the reaction product was a brown glass-like substance and had an acid equivalent weight of 1713 and a hydroxyl equivalent weight of 215 (theory: 188).

The reaction proceeds according to the following scheme:

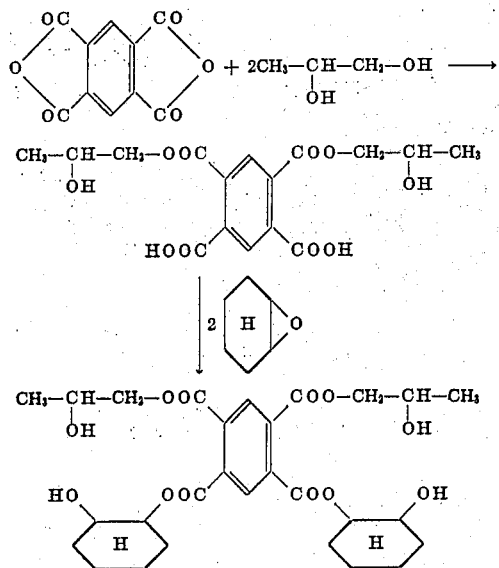

Trihydroxy ester II from trimellitic anhydride, propane-1,2-diol and cyclohexene oxide 266.0 g (3.5 moles) or propane-1,2-diol were treated with 2.0 ml of benzyldimethylamine and the mixture was added to 672.0 g (3.5 moles) of trimellitic anhydride. In the process a pasty reaction mixture forms which is heated to 130°C and to which 960 g (7.0 moles + 40 percent excess) of 95 percent cyclohexene oxide are added dropwise over the course of 1 hour. During this process, increasing solution occurs in a weakly exothermic reaction, but only after 48 hours at 130°C does a clear reaction solution result.

The reaction solution is then freed from volatile constituents at the same temperature under a water jet vacuum.

The resulting product had a hydroxyl equivalent weight of 282 and an acid equivalent weight of 2500. It was in the form of a brown glassy substance.

Processing Examples

Sheets measuring 135 × 135 × 4 mm were manufactured to determine the flexural strength, deflection, impact strength and water absorption; similar sheets, but with a thickness of 1 mm, were manufactured for the tensile strenght test and the shear modulus. The corresponding test specimens were prepared from the sheets; for the tensile strenght test, the test specimens No. 2 corresponding to ISO R 527 were punched out with a well ground tool at about 150°C.

EXAMPLE 1

172 g (0.8 OH equivalent) of tetrahydroxy ester I were stirred for 1 hour at 130°C and 12 mm Hg with 184 g (0.2 equivalent) of polyester A. Under the same vacuum pressure, 87 g (1.0 equivalent) of an isomer mixture of 2,4-toluylene-diisocyanate and 2,6-toluylene-diisocyanate were then added dropwise in a ratio of 65:35 and with an isocyanate content of 11.5 equivalents/kg. The mixture was poured into moulds preheated to 100°C and made from aluminium alloy treated with a silicone resin varnish (registered trademark "Anticorodal"). After a heat treatment for 2 hours at 100°C, bubble-free moulded articles with the following properties were obtained:

tensile strength according to ISO R 527 = 177 kg/cm$^2$ elongation at break according to ISO R 527 = 130 percent

EXAMPLE 2

172 g (0.8 equivalent) of tetrahydroxy ester I were stirred for 1 hour at 130°C and 12 mm Hg with 144 g (0.2 equivalent) of polyester B. Under the same vacuum pressure, 87 g (1.0 equivalent) of the diisocyanate used in Example 1 were added dropwise and the mixture was poured into the moulds which were preheated to 100°C as in Example 1. After the heat treatment for 2 hours, moulded articles with the following properties were obtained:

tensile strength according to ISO R 527 = 820 kg/cm$^2$ elongation at break according to ISO R 527 = 5 percent

EXAMPLE 3

172 g (0.8 equivalent) of tetrahydroxy ester I were stirred for 1 hours at 130°C and 12 mm Hg with 222 g (0.2 equivalent) of polyester C. Under the same vacuum pressure, 87 g (1.0 equivalent) of the diisocyanate used in Example 1 were added dropwise and the mixture was poured into the moulds preheated to 100°C as in Example 1. After the heat treatment for 2 hours, moulded articles with the following properties were obtained:

tensile strength according to ISO R 527 = 260 kg/cm$^2$ elongation at break according to ISO R 527 = 160 percent

EXAMPLE 4

172 g (0.8 OH equivalent) of tetrahydroxy ester I were stirred for 1 hour at 130°C and 12 mm Hg wth 319 g (0.2 equivalent) of polyester D. Under the same vacuum pressure, 112 g (1.0 equivalent) of 3,5,5-trimethyl-3-isocyanato-methylcyclohexane-isocyanate-(1) ("Isophorondiisocyanat") were then added dropwise and the mixture was poured into the moulds preheated to 100°C as in Example 1. After the heat treatment for 2 hours, moulded articles with the following properties were obtained:

tensile strength according to ISO R 527 = 194 kg/cm$^2$ elongation at break according to ISO R 527 = 350 percent

EXAMPLE 5

18.4 g (0.02 equivalent) of polyester A and 22.6 g (0.08 equivalent) of trihydroxy ester II were mixed at 80°C. The mixture was briefly evacuated and then 11.2 g (0.10 equivalent) of isophorondiisocyanat were added thereto. The mixture was briefly evacuated once more at about 60°C and poured into the moulds preheated to 100°C as in Example 1. After a heat treatment for 1 hour at 120°C and 1 hour at 140°C, moulded articles with the following properties were obtained:

tensile strength according to ISO R 527 = 285 kg/cm$^2$ elongation according to ISO R 527 = 285 percent

We claim:

1. A heat-curable composition of matter which comprises
   1. an isocyanate containing on average more than one isocyanate group in the molecule;
   2. a slightly branched polyester which possesses terminal hydroxy groups and corresponds to the general formula $$A-(OH)_x$$

wherein A represents an x-valent, slightly branched long chain polyester radical in which alkylene or alkenylene chains alternate with carboxylic ester groups, and having a molecular weight of about 750 to about 10,000 and x represents the number 3 or 4 and 3. an aromatic polycarboxylic acid hydroxy ester which possesses at least one secondary hydroxyl group and has the formula

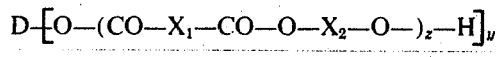

wherein $R_1$, $R_1'$, $R_1''$, $R_1'''$, $R_2$, $R_2'$, $R_2''$, and $R_2'''$ each represent a hydrogen atom or a methyl group, or $R_1$ and $R_2$ or $R_1'$ and $R_2'$ or $R_1''$ and $R_2''$ or $R_1'''$ and $R_2'''$ together represent a bivalent cycloaliphatic radical which is necessary to complete a ring, $R_3$, $R_3'$, $R_3''$ and $R_3'''$ each represent a hydrogen atom or an alkyl with one to four carbon atoms, and at least one of the members $R_3$, $R_3'$, $R_3''$ or $R_3'''$ represents an aliphatic, cycloaliphatic, araliphatic, aromatic or heterocyclic radical, Z is an alkylene radical containing from 2 to 3 carbon atoms, m represents 0 to 1 and n and p represent 1 or 2, and in the curable mixture for every 1 equivalent of isocyanate group of the polyisocyanate (1) there is present in each case 0.3 to 1.0 equivalent of hydroxyl groups of the aromatic polycarboxylic acid ester which contains hydroxyl groups (3) and in each case 0.02 to 0.5 equivalent of hydroxyl groups of the polyester (2).

2. A composition according to claim 1 wherein as the component (1) is a diisocyanate of the cycloaliphatic-aliphatic or araliphatic series.

3. A composition according to claim 2, wherein the component (1) is 3,5,5-trimethyl-3-isocyanatomethyl-cyclohexane-isocyanate-(1).

4. A composition according to claim 2, wherein the component (1) is an isomer mixture of 2,4-toluylene-diisocyanate and 2,6-toluylene-diisocyanate.

5. A composition according to claim 1, wherein the component (2) is a slightly branched polyeser which contains hydroxyl groups and has the general formula $$D-[O-(CO-X_1-CO-O-X_2-O-)_z-H]_y$$

wherein $X_1$ represents the hydrocarbon radical of an aliphatic dicarboxylic acid obtained by spliting off the carboxyl groups and $X_2$ represents the hydrocarbon radical of an aliphatic diol obtained by separation of the hydroxyl groups, D represents the hydrocarbon radical of a y-valent aliphatic or cycloaliphatic polyalcohol obtained by splitting off the hydroxyl groups, y represents 3 or 4 and the integer z, which indicates the average number of the structural elements —CO—X$_1$—CO—O—X$_2$—O— per linear branched chain, is so chosen that the average molecular weight of the polyester is about 750 to about 10,000.

6. A composition according to claim 1, wherein the component (3) is a polyhydroxy ester of trimellitic acid

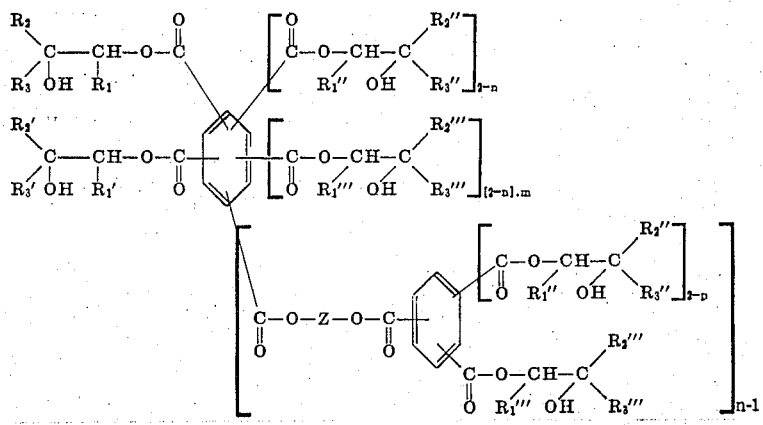

which contains at least one secondary hydroxyl group and has the formula

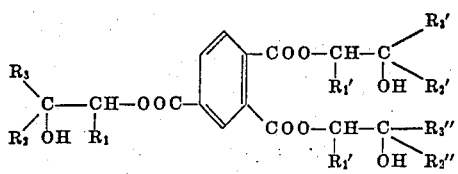

wherein the symbols R have the same meanings as in claim 1.

7. A composition according to claim 6, wherein the component (3) is the trimellitic hydroxy ester of the formula

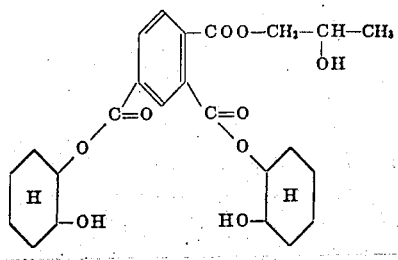

8. A composition according to claim 1, wherein the component (3) is a polyhydroxy ester of pyromellitic acid which contains at least one secondary hydroxyl group and has the formula

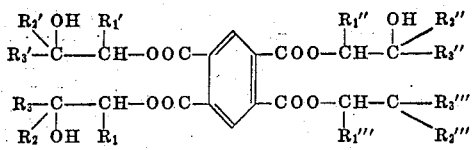

wherein the symbols R have the same meanings as in claim 1.

9. A composition according to claim 8, wherein the component (3) is the pyromellitic hydroxy ester of the formula

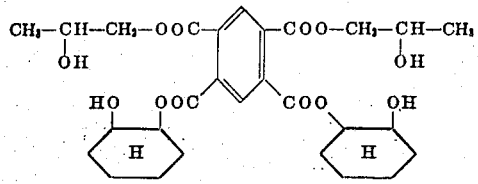

* * * * *